(12) United States Patent
Korte (10) Patent No.: US 9,644,862 B1
(45) Date of Patent: May 9, 2017

(54) AIR DUCT FILTER APPARATUS AND SYSTEM

(71) Applicant: Christine M. Korte, Madera, CA (US)

(72) Inventor: Christine M. Korte, Madera, CA (US)

( * ) Notice: Subject to any disclaimer, the term of this patent is extended or adjusted under 35 U.S.C. 154(b) by 0 days.

(21) Appl. No.: 15/201,577

(22) Filed: Jul. 4, 2016

(51) Int. Cl.
| F24F 13/28 | (2006.01) |
| B01D 46/00 | (2006.01) |
| F24F 13/08 | (2006.01) |
| F24F 13/14 | (2006.01) |
| F24F 13/02 | (2006.01) |
| F24F 3/16 | (2006.01) |

(52) U.S. Cl.
CPC .......... *F24F 13/28* (2013.01); *B01D 46/0005* (2013.01); *F24F 13/0209* (2013.01); *F24F 13/085* (2013.01); *F24F 13/14* (2013.01); *B01D 2265/024* (2013.01); *B01D 2265/028* (2013.01); *B01D 2277/30* (2013.01); *B01D 2279/50* (2013.01); *F24F 2003/1614* (2013.01)

(58) Field of Classification Search
CPC ............ B01D 46/0002; B01D 46/0005; B01D 46/0006; B01D 2279/50; F24F 3/1603; F24F 13/082; F24F 13/085; F24F 13/28; F24F 2003/1614
See application file for complete search history.

(56) References Cited

U.S. PATENT DOCUMENTS

| 6,215,885 B1 * | 4/2001 | Geiger | H04R 1/023 |
| | | | 181/224 |
| 6,422,935 B1 * | 7/2002 | Yampolski | F24F 13/068 |
| | | | 454/289 |
| 2002/0026776 A1 | 3/2002 | McNaughton | |
| 2002/0069599 A1 | 6/2002 | Dhallan | |
| 2003/0145568 A1 | 8/2003 | Hodge | |
| 2004/0058637 A1 | 3/2004 | Laiti | |
| 2004/0074214 A1 | 4/2004 | Henson | |
| 2004/0223891 A1 | 11/2004 | Brown | |
| 2005/0003754 A1 | 1/2005 | Pilger | |
| 2007/0140924 A1 | 6/2007 | Hill | |
| 2009/0078121 A1 * | 3/2009 | Hepburn | A61L 9/16 |
| | | | 96/222 |
| 2012/0079945 A1 | 4/2012 | Roberts | |
| 2013/0186050 A1 | 7/2013 | Skopis | |
| 2014/0141709 A1 | 5/2014 | Hammer | |
| 2014/0161673 A1 | 6/2014 | Hammer | |
| 2015/0096271 A1 * | 4/2015 | Cole | B01D 46/4227 |
| | | | 55/385.2 |
| 2015/0292755 A1 | 10/2015 | Pickett | |

* cited by examiner

*Primary Examiner* — Robert Clemente

(74) *Attorney, Agent, or Firm* — Richard A. Ryan (57) ABSTRACT

An air duct filter apparatus for filtering air discharged from an air duct into a room, vehicle or other space at a duct opening in a surface. The apparatus has a venting device, such as a register or vent, that fits within the duct opening. A pair of filter brackets on the venting device support an air filter behind a venting area, typically having louvers, of the venting device. Preferably, the air filter is sized to frictionally engage the filter brackets so it will be held in place but be easily removable from the brackets. A pair of duct brackets are mounted to the surface on opposite sides of the duct opening. A connecting mechanism connects the venting device with the duct brackets in a manner that allows the venting device to be pulled away from the surface to inspect, clean or replace the air filter without using tools.

20 Claims, 7 Drawing Sheets

AIR DUCT FILTER APPARATUS AND SYSTEM

BACKGROUND OF THE INVENTION

A. Field of the Invention

The field of the present invention relates generally to apparatuses for filtering air that flows into a room, vehicle or other space. In particular, the present invention relates to air filter apparatuses, including those that are configured as a register, which can be utilized with existing heating, cooling and other air ventilation systems to filter air that flows from an air duct system into an open space. Even more particularly, the present invention relates to such air filter apparatuses that removably support an air filter and which allow the user to replace the air filter without removing the filter apparatus from the air duct system.

B. Background

Many enclosed or partially enclosed spaces have an air ventilation system that is utilized to circulate air, often heated, cooled and/or otherwise treated or conditioned air, into and through the space to heat, cool, refreshen or otherwise change the air in the space. Such spaces include the interior of a house, office, store or other building, the interior of a car, truck or other motorized vehicle and the like. One common feature of most air ventilation systems utilized to circulate air into and through a space is that the treated or conditioned air is typically produced at a centralized heating/cooling unit (i.e., a HVAC unit) and then directed into the structure (i.e., home or vehicle) that defines and, at least generally, encloses the space that is to be treated or conditioned using a duct system. The typical duct system comprises a generally tubular structure that connects the heating/cooling unit with the space to be heated, cooled or otherwise treated. Most duct systems have a main duct that connects to the heating/cooling unit and one or more other ducts, typically a plurality of other ducts, which branch off from the main duct to deliver and direct the treated/conditioned air into the space or spaces. The main and branch ducts may have a square, rectangle, round, oval or a variety of other cross-sectional shapes and be made out of a wide variety of materials, including metal or plastic (with aluminum or steel typically being the most common material for structures and plastic typically being the most common for vehicles).

With regard to houses, offices, stores, warehouses and other residential, commercial and industrial buildings, the typical duct system comprises a main duct having many branches that each terminate at an open area in a wall or a ceiling that directs the treated/conditioned air in to a room or other space that is at least partially defined by the wall or ceiling. Although the open area could be left open, most people would consider such a look to be unfinished, particularly for houses, offices, stores and the like. To provide an improved visual appearance for the terminal open area of the duct, most air ventilation systems utilize a vent or vent-like apparatus, commonly referred to as a register, to cover the open area at the wall or ceiling. As well known in the art, in addition to providing an improved visual appearance, most registers are structured and arranged with a plurality of vent members, which define a venting area, that are selected to direct the air from the duct system in a direction that provides improved air circulation in the space where the treated/conditioned air is desired. As also well known, many registers are also structured and arranged to allow a person to adjust the positioning of the vent members, typically with a lever or the like that allows the user to pivot the vent members up and down and/or left and right, to direct the treated/condition air into the space in a manner which he or she believes improves or otherwise beneficially changes the circulation of the air in the room or other space. In use, most registers have a frame portion around the venting area that is removably mounted with one or more screws, bolts or like connectors to the wall or ceiling substantially adjacent to the open area of the terminus of the ducts. The manufacture, configuration and use of such registers are well known by those skilled in the relevant art.

With regard to air circulating systems in cars, trucks, boats and like motor vehicles, the treated/conditioned air is directed into the interior space of the vehicle through a duct system that terminates at one or more, typically a plurality, of vent structures. Though not commonly, or at least less commonly referred to as a register, these vent structures nonetheless serve basically the same function as a register in a building or other structure. More specifically, these vent structures typically have a plurality of vent members, which define the venting area, that receive and direct the treated/conditioned air to the inside of the vehicle. As with registers used in buildings and other structures, the vent members of most such vent structures are structured and arranged to be adjusted by a person in the vehicle to direct the air in a manner desired by the person. The typical vent structure in a vehicle is fixedly mounted, or at least substantially fixedly mounted, in the dash, door, seat or other component in the vehicle.

Most current air circulating systems have one or more air filtration components that are structured and arranged to filter the air that is drawn into the heating/cooling unit to prevent dirt, dust, pollen and other materials from entering into the unit, where the materials could possibly cause harm to the unit, and then being discharged into the space. Typically, any such air filtration components are either directly associated with the heating/cooling unit, such as being built into or attached to the unit, or are positioned at the terminus point of an air draw duct. As generally well known, most homes utilize the latter configuration, with a filter being located inside the home to draw air from inside the structure to the heating/cooling unit. Most often, such filters are located behind an air intake vent that is positioned in the ceiling. The air intake vent is typically configured to open, often pivotally, for access to the filter to allow a homeowner, renter or other person to periodically replace the filter. Many offices, stores and other business or commercial structures also use this same configuration to filter air that is drawn into the heating/cooling unit. The configuration and use of these air filtration systems and the air filters that are commonly utilized to filter the intake air are generally well known to persons skilled in the relevant art.

Despite the use of filters and the like to filter the intake air drawn into the heating/cooling unit, it is still common for dirt, dust, pollen and other materials to pass through the heating/cooling unit and be discharged into the duct system and to the space that receives the treated or conditioned air. In fact, because of this problem, there are businesses which offer duct cleaning services to remove the materials that accumulate in the ducts of a typical duct system. Although for the most part, the accumulation of this material in the ducts is out of sight and, as a result, out of mind, the fact is that the materials are blown into the space that is being treated or conditioned. As well known, many of these materials are allergens that cause sneezing and related problems for many people, particularly people who are sensitive to allergies. Even if the materials do not cause allergy problems, they do cause the accumulation of the materials, usually considered generally as dust, on surfaces inside the space (i.e., the home, office or store), including items such as tables, furniture, counters and the like. Naturally, this accumulation of dust or other material is not desired by those who live in, visit or otherwise spend time in the space.

A variety of discharge air filtration devices and systems have been developed to reduce the amount of dirt, dust, pollen and other materials that are discharged from the duct system through the register and into the space that is receiving the treated or conditioned air from the heating/cooling system. Typically, these devices and systems position an air filter mounted in the air duct behind the register or other vent. However, as well known, because these registers or vents are mounted to the wall around the duct opening, the user must unscrew, unbolt or otherwise disconnect and remove the register or vent from the wall to access the air filter inside the duct to inspect the air filter to determine if it needs to be cleaned or, more typically, replaced. To ensure clean air being discharged into the space, the inspection and cleaning/replacing of the air filter must be performed on a periodic basis. As well known to persons who do such activities, removing the register or other vent from the wall is time consuming and relatively labor intensive, particularly because these registers or vents are typically not easy to reach.

To eliminate the need for the person to remove the register or vent from the wall, some discharge air filtration systems are mounted on or near the exterior surface of the register or vent. These exterior mounted systems generally have a filter, which is typically removably held in place to filter the discharge air as it exits the duct and before it is spread throughout the space that will receive the treated or conditioned air. While these air filtration systems provide an air filter that is much easier to inspect and to clean or replace, as necessary, than the systems that position the air filter inside the duct behind the register/vent, they are not very commonly utilized. In part, the low utilization of the exterior positioned air filtration systems may be due to a negative impact on the visual appearance of having a filter apparatus mounted on the outside of a register/vent.

Despite the prior art, what is needed is an improved apparatus and system for filtering air that is discharged from a duct in an air circulating system having a heating/cooling unit that discharges air into a space through the duct. In a preferred configuration, the new apparatus and system should be structured and arranged to be utilized with existing air circulating systems having a duct system that discharges air into a room or other space through a register or vent that covers a duct opening located in a wall, ceiling or other surface in the space. The new apparatus and system should be structured and arranged to position an air filter in the duct behind the register or vent so as to filter the discharge air before it enters the room or other space and to provide a visual appearance that is the same as or substantially the same as existing register/vent systems. The new apparatus and system should also be configured to allow a person to be able to easily access the air filter that is positioned behind the register or vent so he or she can easily and quickly inspect the air filter and clean or replace it as necessary. Preferably, the improved apparatus and system should be configured so the user can access the air filter without using tools to separate or otherwise move the register/vent from the wall. The preferred apparatus and system should comprise or be utilized with a register or vent that is not significantly more expensive than existing register/vents utilized in air circulating systems.

SUMMARY OF THE INVENTION

The new air duct filter apparatus and system of the present invention provides the benefits and solves the problems identified above. That is to say, the air duct filter apparatus and system of the present invention is structured and arranged to be utilized in an air circulating system that discharges air, typically treated or conditioned air, through a register or other vent into a room or other space. The new apparatus and system positions a removable air filter in a duct opening behind the register or vent to filter the discharge air before it enters the room or other space. Because the air filter is positioned behind the register or vent, the new apparatus provides a visual appearance that is the same as or substantially the same as existing register/vent systems. The new apparatus and system is also structured and arranged to allow a person to be able to access the air filter that is positioned behind the register or vent so he or she can easily and quickly inspect the air filter and clean or replace it as necessary. The new air duct filter apparatus and system is configured so the user can access the air filter without using tools to separate or otherwise move the register/vent from the wall. In a preferred configuration, the new apparatus and system comprises or is utilized with a register or vent that is not significantly more expensive than existing register/vents that are utilized in existing air circulating systems.

The air duct filter apparatus of the present invention is sized and configured to attach to and fit over a discharge duct opening of a duct system having one or more ducts that deliver air, typically treated or conditioned air, into a room or other space. The new apparatus removably positions an air filter inside the discharge duct opening. When the new air duct filter apparatus is in use and positioned at the duct opening, the air filter will remove dirt, dust, pollen and other undesirable materials from the discharge air before it enters the space, where the materials can cause allergy problems for persons in the space and/or accumulate as dust on items in the space. The apparatus is structured and arranged to allow a person to merely pull outward on the register/vent to separate the register/vent from the wall and access the air filter for inspection, cleaning and/or replacement. As such, the air filter of the new apparatus can be accessed without the use of tools for inspection, cleaning or replacement.

In one embodiment of the present invention, the air duct filter apparatus generally comprises a venting device, an air filter, one or more filter brackets, one or more duct brackets and a duct connecting mechanism that cooperate together to filter air which will be discharged from an air duct into a space at a duct opening in a surface (such as a wall, ceiling, floor, dashboard and the like) that is associated with the space. The venting device has a frame that defines a venting area with one or more openings through which the air passes from the air duct into the space when the filter apparatus is in its closed position with a back surface of the venting device in abutting relation to the surface at the duct opening and a front surface of the venting device toward the space. The air filter has a filter component that is configured and selected to filter the air so as to remove undesirable materials (such as dirt, dust and pollen) or other contaminants. The filter brackets are attached to or integral with the venting device, typically the back surface of the venting device, and are structured and arranged to position the filter component of the air filter substantially rearward of the venting area (between the air duct and the venting area) so as to filter the air before the air will be discharged to the space. The duct brackets are attached to or integral with one of the air duct and the surface at the duct opening. The connecting mechanism, which in a preferred embodiment is a spring wire, interconnects the duct brackets and the venting device and/or the filter brackets. The connecting mechanism is structured and arranged to selectively allow the filter apparatus to be moved between its closed position and an open position. In the open position, the venting device and the air filter are in spaced apart relation with the surface and the duct opening to allow access to the air filter so a person can inspect and/or remove the air filter from the filter brackets without requiring tools. In one configuration, the venting has one or more louvers in the venting area so as to define a plurality of the openings for the air to pass from the air duct to the space. The filter apparatus can also have an adjusting mechanism that is associated with the louvers, with the adjusting mechanism being structured and arranged to adjust the size of the openings and direct the air flow in the manner desired by the user. The adjusting mechanism can comprise a lever that is accessible from at or near the front surface of the venting device.

In a preferred configuration, the filter apparatus has a pair of filter brackets, comprising a first filter bracket and a second filter bracket, that are placed in spaced apart relation to each other so as to receive the air filter therebetween. In a preferred configuration, the first filter bracket and the second filter bracket are cooperatively sized and configured with the air filter so each of the first filter bracket and the second filter bracket will frictionally engage the air filter to securely position the filter component of the air filter rearward of the venting area of the venting device but allow a person to easily remove the air filter from the filter apparatus when necessary or needed. In one configuration, each of the first filter bracket and the second filter bracket have a proximal end attached to or integral with the back surface of the venting device, a distal end positioned rearwardly from the back surface of the venting device, a rearward extending member generally extending between the proximal end and the distal end and a U-shaped section at the distal end defining an open area. In this configuration, the air filter extends between the open area of the first filter bracket and the open area of the second filter bracket so as to frictionally engage the U-shaped section of the first filter bracket and the U-shaped section of the second filter bracket. The first filter bracket and the second filter bracket can each have a mounting member at the proximal end thereof that is configured to be attached to the back surface of the venting device.

A preferred configuration of the filter apparatus also comprises a pair of duct brackets, namely a first duct bracket and a second duct bracket, that are in spaced apart relation to each other. Each of the first duct bracket and the second duct bracket have an outward extending member that is sized and configured to be placed against the surface at the duct opening. Each of the outward extending members have an aperture that is positioned thereon so as to be in alignment with an aperture, such as an existing aperture for the prior art venting device, in the surface when the duct members are secured at the duct opening. Each of the first duct bracket and the second duct bracket also have an inwardly extending member with a slot therein. The duct connecting mechanism being structured and arranged to engage the slot in the inwardly extending member.

Accordingly, the primary object of the present invention is to provide a new air duct filter apparatus and system that has the advantages set forth above and which overcomes the various disadvantages and limitations that are associated with presently available apparatuses and systems for filtering air that is discharged through a register or vent.

It is an important object of the present invention to provide a new air duct filter apparatus and system that is structured and arranged to be utilized with an air circulating system that discharges air, typically air which is treated or conditioned, through a register or vent into a room or other space.

An important aspect of the present invention is that it provides a new air duct filter apparatus and system that accomplishes the objectives set forth above and elsewhere in the present disclosure.

Another important aspect of the present invention is that it provides a new air duct filter apparatus and system that positions a removable air filter in a duct opening behind a register or vent to filter the discharge air before it enters the room or other space and to provide a visual appearance that is the same as or substantially the same as existing register/vent systems.

Another important aspect of the present invention is that it provides a new air duct filter apparatus and system that positions a removable air filter in a duct opening behind a register or vent to filter the discharge air before it enters the room or other space to substantially reduce the amount of dirt, dust, pollen and other undesirable materials that will enter into the space.

Another important aspect of the present invention is that it provides a new air duct filter apparatus and system that is structured and arranged to allow a person to be able to access an air filter that is positioned in a duct opening behind a register or vent so he or she can easily and quickly inspect the air filter and clean or replace it as necessary.

Another important aspect of the present invention is that it provides a new air duct filter apparatus and system that is configured so the user can access the air filter component without using tools to separate or otherwise move the register/vent component from the wall.

Yet another important aspect of the present invention is that it provides a new air duct filter apparatus and system that is relatively inexpensive to manufacture.

As will be explained in greater detail by reference to the attached figures and the description of the preferred embodiment which follows, the above and other objects and aspects are accomplished or provided by the present invention. As set forth herein and will be readily appreciated by those skilled in the art, the present invention resides in the novel features of form, construction, mode of operation and combination of processes presently described and understood by the claims. The description of the invention which follows is presented for purposes of illustrating one or more of the preferred embodiments of the present invention and is not intended to be exhaustive or limiting of the invention. The scope of the invention is only limited by the claims which follow after the discussion.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures are illustrative of several potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular materials, shapes and configurations for the various components of the new air duct filter apparatus and system of the present invention, as well as the register and air filter with which the new apparatus and system can be utilized, those skilled in the art will readily appreciate that the present invention is not so limited. In addition, the exemplary embodiment of the present apparatus is shown and described herein with only those components that are required to disclose the present invention. As such, many of the necessary mechanical elements for attaching and using the present invention are not shown or necessarily described below, but which are well known to persons who are skilled in the relevant art. As will be readily appreciated by such persons, the various elements of the present invention that are described below may take on any form consistent with forms that are readily realized by a person of ordinary skill in the art having knowledge of air circulating systems, air duct registers and air filters.

Figure 1:
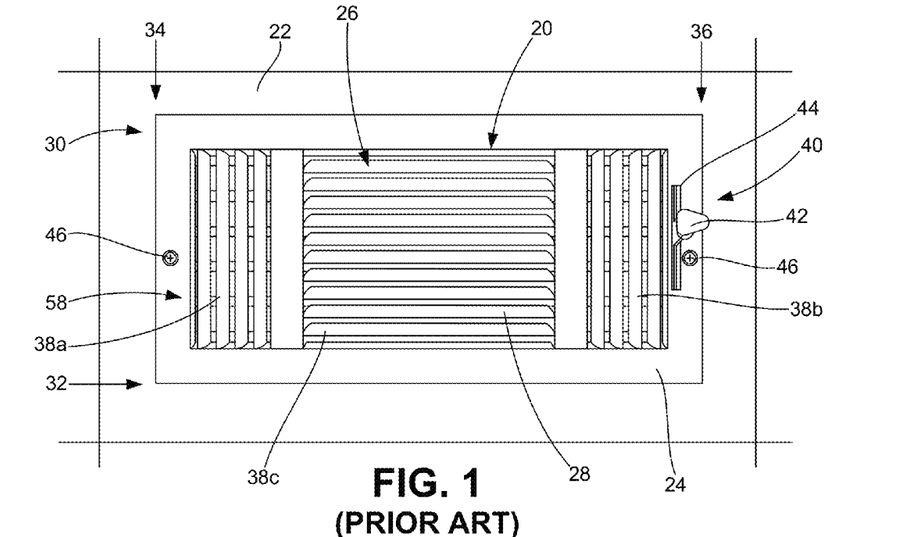
FIG. 1 is a front view of a prior art register that is utilized with an air circulating system, with the register shown attached to a wall.
Figure 2:
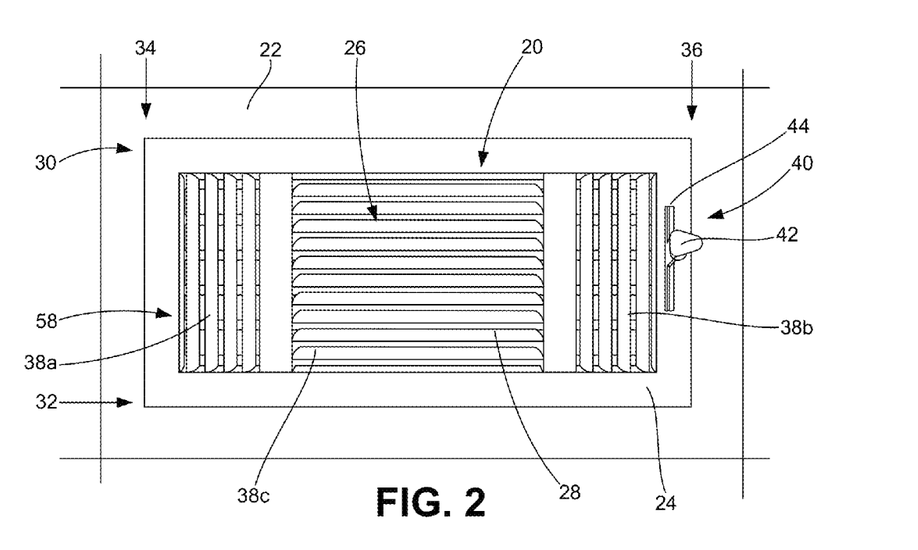
FIG. 2 is a front view of an air duct filter apparatus that is configured according to one of the preferred embodiments of the present invention shown in position next to a wall.
Figure 15:
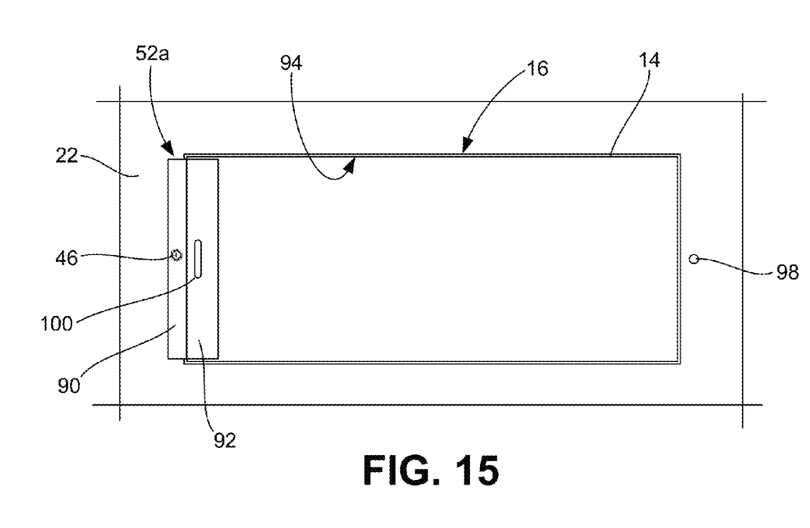
FIG. 15 is a front view of a prior art duct opening at the terminal end of an air duct showing a first duct bracket mounted thereto.
Figure 19:
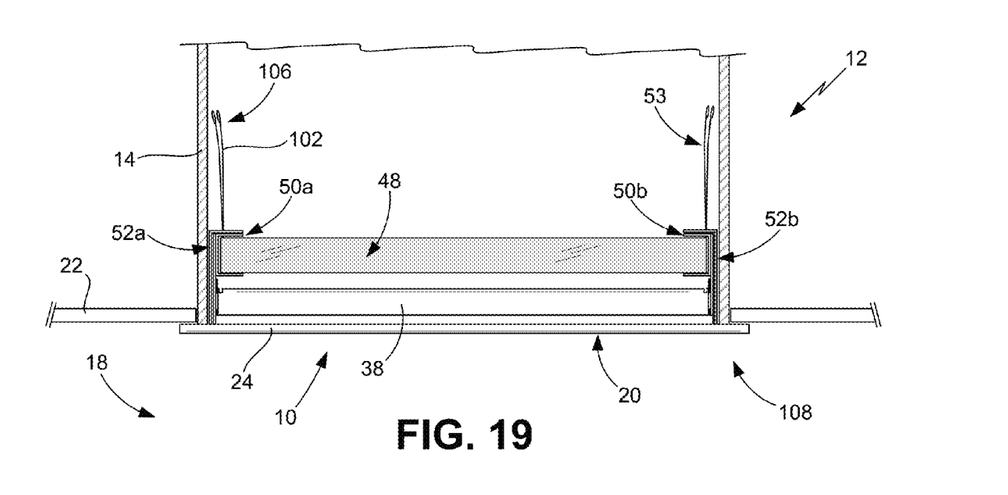
FIG. 19 is a top view of an air duct circulating system configured according to one of the preferred embodiments of the present invention utilizing the air duct filter apparatus of FIG. 3, with the filter apparatus shown in its closed position positioning the venting device at the duct opening of FIG. 15 at the terminal end of an air duct with the register in position against the wall of FIG. 2 and the air filter disposed inside the duct.
Figure 20:
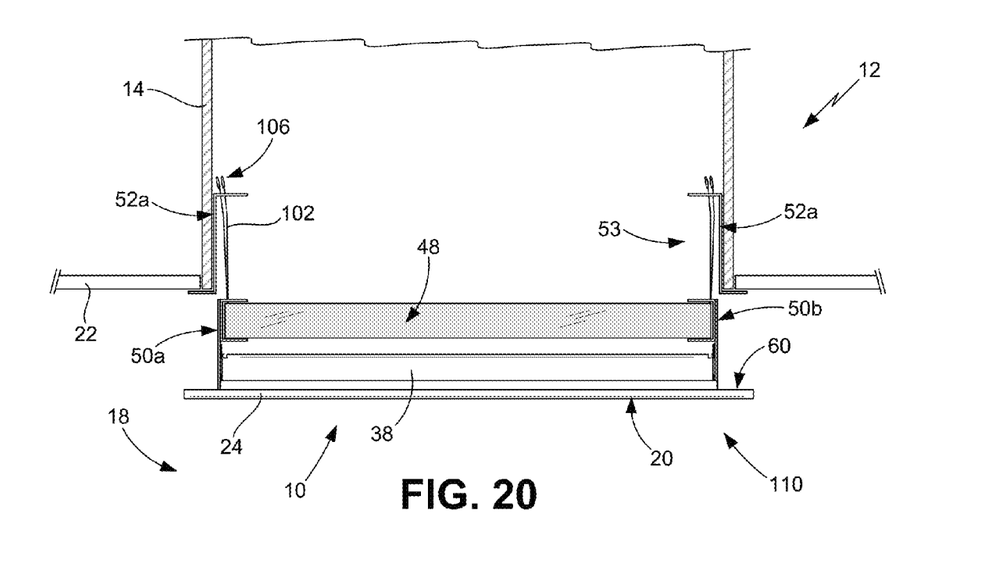
FIG. 20 is a top view of the air duct circulating system of FIG. 19 with the air duct filter apparatus shown in its open position pulled away from the wall to allow access to the air filter.

An air duct filter apparatus that is configured pursuant to one of the preferred embodiments of the present invention is referred to generally as 10 in FIGS. 2-5 and 19-20. The air duct filter apparatus 10, herein referred to as the "filter apparatus", is utilized with an air duct circulating system 12 having at least one tubular-shaped air duct 14 that terminates at a duct opening 16 through which air, typically treated or conditioned air, is discharged into a space 18, as best shown in FIGS. 15, 19 and 20. As will be readily appreciated by persons skilled in the art, the typical prior art air duct circulating system has a venting device 20 such as a register or vent, that is mounted to a wall, ceiling or other surface 22, as shown in FIGS. 1-2 and 19-20, that is around the duct opening 16 where the air duct 14 opens into the space 18 that receives the treated or conditioned air. For purposes of describing the present invention, the term "venting device" is utilized herein to refer to the typical air duct register (such as shown in FIGS. 1 and 2) that is used in most home, office and business air circulating systems 12, as well as to other vent or vent-like devices that may also be used in a house, office, business or other structure and in motor vehicles, such as cars, trucks, boats, RVs or the like. Unless otherwise specifically identified as a "register", the venting device 20 used with the filter apparatus 10 of the present invention is not limited to use only with a register as the venting device 20.

The typical venting device 20 has a frame 24 that defines a venting area 26 with an opening 28 that allows the air from the air duct 14 to be discharged into the space 18 (as best shown in FIGS. 1-2, 4, 8 and 19-20). The venting device 20 shown in the figures, which is rectangularly shaped, has a top edge 30, bottom edge 32, first or left side 34 and a second or right side 36. As well known in the art, the venting device 20 may be square, round, oval or a variety of other shapes. Most venting devices 20 have one or more louvers 38 that are configured to better distribute the discharged air (versus just an open area) through the venting area 26 to the space 18. In the embodiment of the venting device 20 shown in the figures, the venting device 20 has a plurality of louvers 38 that define a plurality of openings 28. Although some venting devices 20 have louvers 38 that are all disposed in a common direction, such as horizontal, vertical or at an angle, across the entire venting area 26 of the venting device 20, most have louvers 38 that are disposed in different directions. The venting device 20 shown in the figures has some of the louvers 38 being vertically disposed, shown as vertical louvers 38a toward the first side 34 and louvers 38b toward the second side 36, and horizontal louvers 38c, as shown in FIGS. 1 and 2. Although venting devices 20 are often made out of metal or plastic, they can be made out of a wide variety of different materials.

Although some venting devices 20 have louvers 38 that are fixed with regard to the direction which air will flow outward therefrom and the size of the openings 28, most venting devices 20 have an adjusting mechanism 40 that allows a person to adjust the angle of the louvers 38 and the size of the openings 28 to control the direction the air will flow from the venting device 20 and how much, if any, air will flow through the venting area 26. In the embodiment shown in the figures, the adjusting mechanism 40 comprises a lever 42 that moves upward and downward (i.e., toward and away from the top edge 30 and bottom edge 32 of the venting device 20) in a slot 44 in the frame 24. Other venting devices 20 may have differently configured adjusting mechanisms 40.

In the prior art, the venting device 20 is connected to the wall, ceiling or other surface 22 around the duct opening 16 using one or more wall connecting elements 46, which can be screws, bolts or the like. In FIG. 1, the venting device 20 is connected to the surface 22 using a wall connecting element 46 (which in the drawings is a screw) in an aperture (not shown) in the frame 24 toward each of the sides 34/36 of the venting device 20. As set forth in the Background, if the user wanted to remove the venting device 20, he or she would have to unscrew, unbolt or otherwise disconnect wall connecting elements 46 from the wall to gain access to the interior of the air duct 14 to inspect any air filter that is disposed inside the air duct 14 to determine if the air filter needs to be cleaned or, more typically, replaced. As well known to persons who do such activities, removing the venting device 20 from the surface 22 is time consuming and relatively labor intensive, particularly because the venting device 20 is typically positioned in a place that is generally not easy for most persons to reach (i.e., toward the top edge of a wall or on the ceiling) without a ladder, stool or like apparatus.

Figure 3:
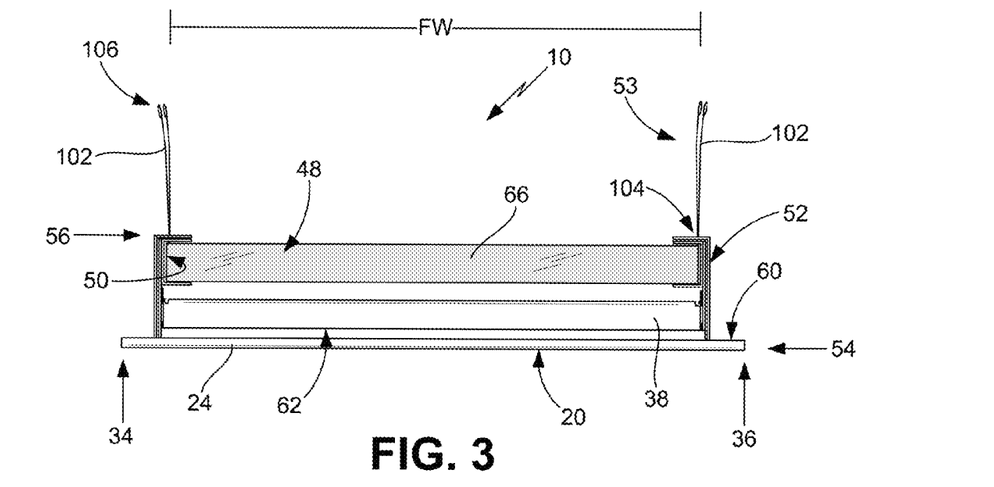
FIG. 3 is a top view of the air duct filter apparatus of FIG. 2 shown separate from the wall with an air filter held in place by the apparatus and the duct bracket positioned next to the filter bracket.
Figure 4:
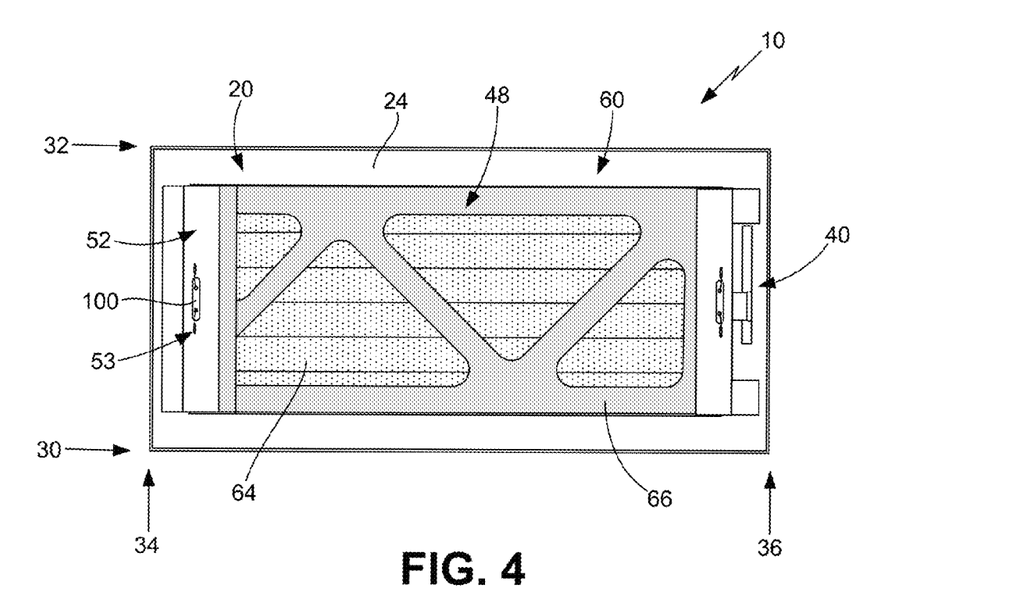
FIG. 4 is a back view of the air duct filter apparatus of FIG. 3.
Figure 5:
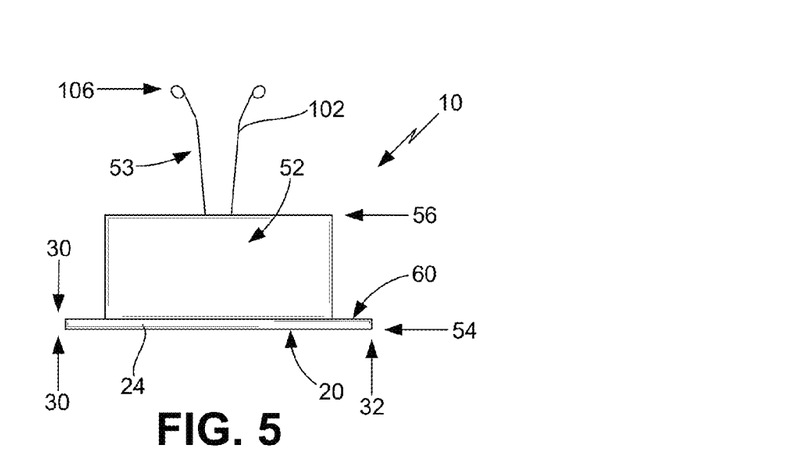
FIG. 5 is a left side view of the air duct filter apparatus of FIG. 3.

As set forth in more detail below, the filter apparatus 10 of the present invention generally comprises a venting device 20, an air filter 48 associated with the venting device 20, a filter bracket 50 that is attached to the venting device 20 to removably support the air filter 48 behind the venting device 20, a duct bracket 52 that is attached to the surface 22 at the duct opening 16 and a duct connecting mechanism 53 that connects the venting device 20 (and air filter 48) to the duct bracket 52, as best shown in FIGS. 2-4. As also set forth below, the components of the filter apparatus 10 are structured and arranged to filter out undesirable materials (dirt, dust, pollen and the like) to prevent those materials from being discharged from the air duct 14 into the space 18 and to allow a person to easily and quickly be able to visually inspect and then, if necessary, clean or replace the air filter without having to use tools to separate the venting device 20 from the surface 22 (filter apparatus 20 does not utilize wall connecting elements 46).

With regard to the venting device 20 for use with the filter apparatus 10 of the present invention, the venting device 20 can be of any size and shape, be made out of any type of material, have any number of and configuration of louvers 38, have any type of adjusting mechanism 40 (or have no adjusting mechanism 40) and have different types of wall connecting elements 46. As will be readily appreciated by persons who are skilled in the relevant art, the venting device 20 of filter apparatus 10 will have to be sized and configured (i.e., dimensioned) to be in corresponding relation to the size and configuration of the duct opening 16 at the terminal end of the air duct 14 with which filter apparatus 10 will be utilized so a portion of the filter apparatus 10 will be positioned outside the surface 22 around the duct opening 16 and a portion of the filter apparatus 10, including the air filter 48 will be positioned in the air duct 14, as shown in FIGS. 19-20. More specifically, as shown in these figures, the front end 54 of filter apparatus 10, which includes the frame 24 of the venting device 20, will be at or extending outward from the surface 22 and the back end 56 of venting device 20 will be disposed somewhat inside the air duct 14 (with the front end 54 and back end 56 best shown in FIGS. 3, 6 and 7). For purposes of describing the present invention, the terms "front", "forward" and "forwardly" refer to or toward the portion of the filter apparatus 10 that is seen by a person when looking at the surface 22 with the filter apparatus 10 in place and the terms "back", "rearward" and "rearwardly" refer to or toward the portion of the filter apparatus 10 that is positioned inside the air duct 14 when the filter apparatus 10 is in use to filter the air that is discharged or will be discharged from the air duct 14 by the air duct circulating system 12 (also referred to as "circulating system 12"). In use, the front surface 58 of venting device 20 will be facing away from the surface 22 and be seen by persons who look toward the surface 22 and the back surface 60 of venting device 20 will be flush or nearly flush against the surface 22, as shown in FIGS. 1-6, 8 and 19-20.

The air filter 48 is selected to allow air from the circulating system 12 to be discharged to the space 18 through the air duct 14 while filtering out dirt, dust, pollen and other undesired materials (e.g., particulate matter, contaminants and the like). To be utilized with the filter apparatus 10 of the present invention, the air filter 48 must be sized and configured to be removably (preferably) supported behind the venting area 26 of the venting device 20 so that when the louvers 38 are in their open position 62, as shown in FIGS. 2-3 and 6-7, the filtered air will flow through the openings 28 in the venting area 26 defined by the open louvers 38. As generally well known in the relevant art, air filters 48 have a filter component 64 and filter frame 66, as best shown in FIGS. 3 and 4. The filter component 64 is typically selected to be able to filter a certain size and/or type of undesirable materials to prevent those materials from being discharged into the space 18. The filter frame 66 is structured and arranged to generally hold the materials that make up the filter component 64 together in the desired size and shape for the air filter 48. Preferably, the filter component 64 of air filter 48 is sized and configured to at least substantially be dimensioned in corresponding relation with the venting area 26 of the venting device 20 with which it will be utilized so as to filter the air from air duct 14 without creating a "bottleneck" in the filter apparatus 10 for the discharged air. The manufacture, configuration and use of air filters that can be utilized as the air filter 48 for the filter apparatus 10 of the present invention are generally well known in the art.

Figure 6:
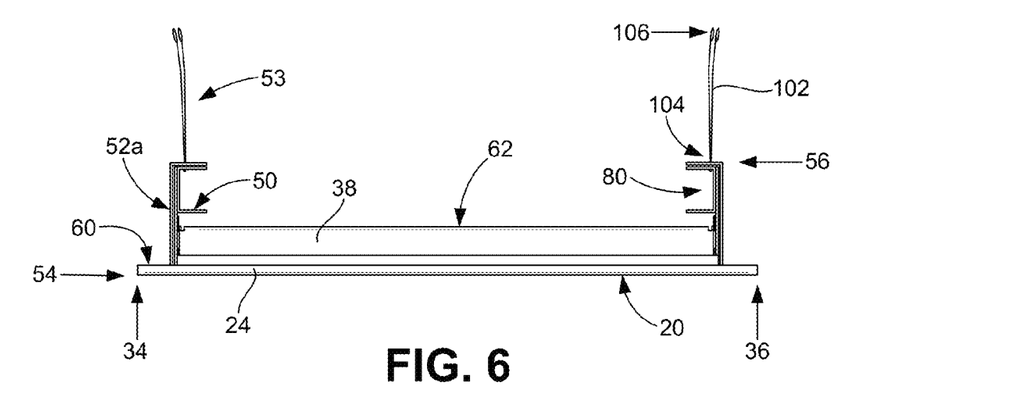
FIG. 6 is a top view of the air duct filter apparatus of FIG. 3 shown without the air filter.
Figure 7:
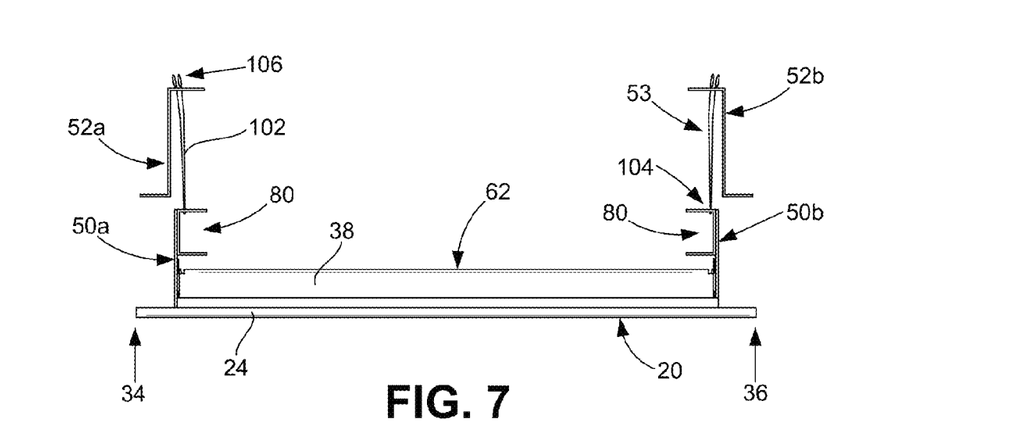
FIG. 7 is a top view of the air duct filter apparatus of FIG. 6 with the register shown separate from the duct bracket.
Figure 9:
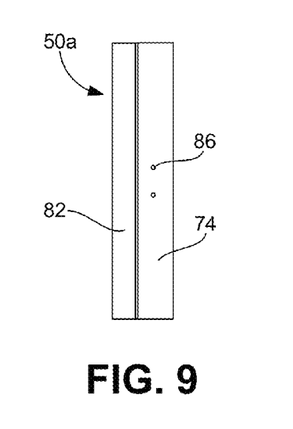
FIG. 9 is a back view of the first filter bracket utilized with the air duct filter apparatus shown in FIG. 3.
Figure 10:
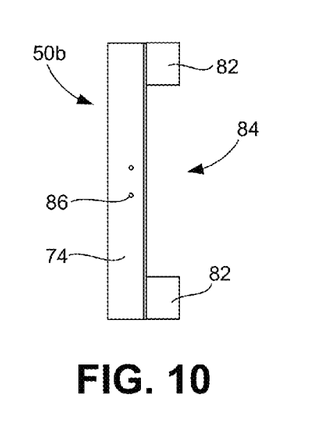
FIG. 10 is a back view of the second filter bracket utilized with the air duct filter apparatus shown in FIG. 3.
Figure 11:
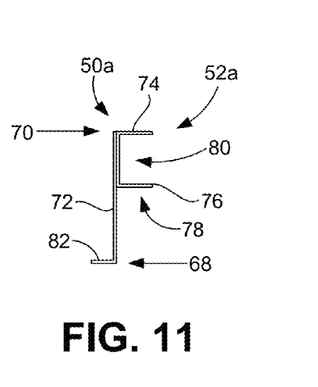
FIG. 11 is a top view of the first filter bracket of FIG. 9.
Figure 12:
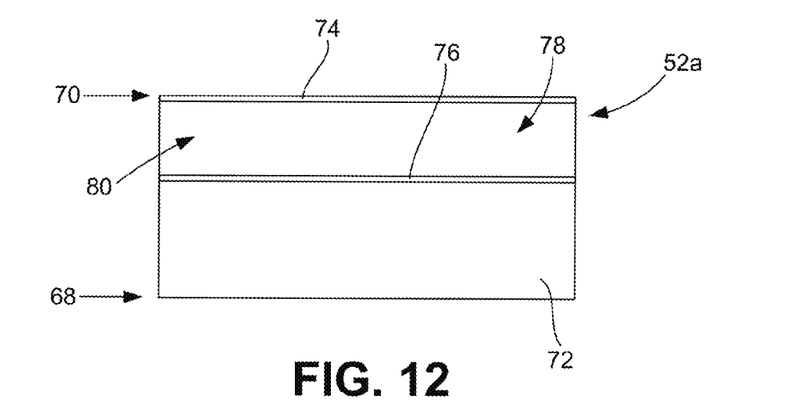
FIG. 12 is a side view of the first filter bracket of FIG. 11 as viewed from the venting area of the venting device.
Figure 13:
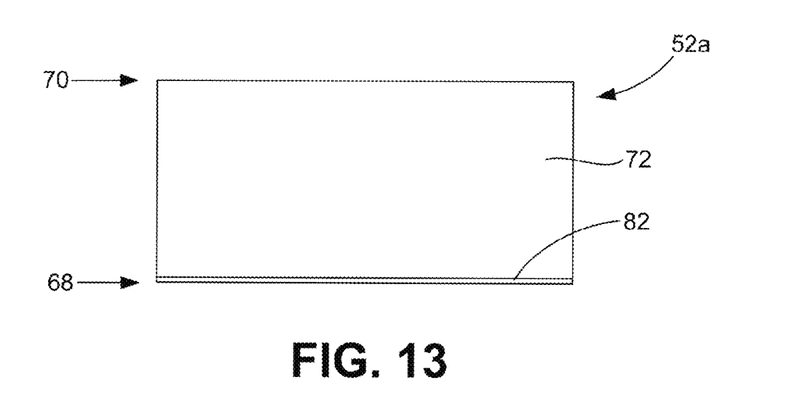
FIG. 13 is a side view of the first filter bracket of FIG. 11 as viewed from the first side of the venting device.
Figure 14:
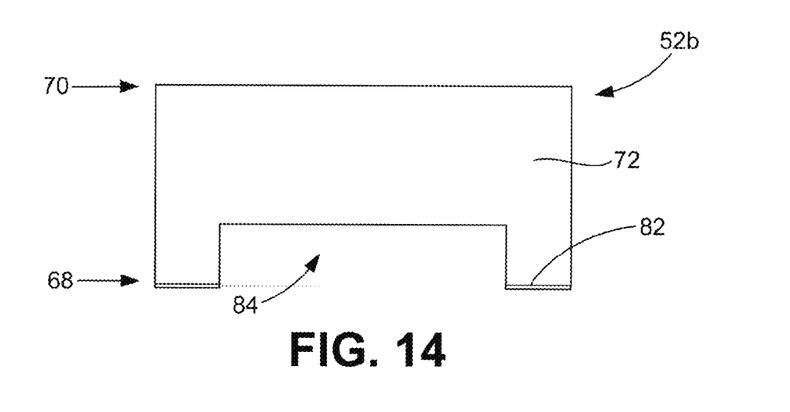
FIG. 14 is a side view of the second filter bracket of FIG. 10 as viewed from the second side of the venting device.

The filter bracket 50, shown separately in FIGS. 9-14, is structured and arranged to support the air filter 48 behind the venting area 26 of the new filter apparatus 10 of the present invention, as shown in FIGS. 3, 19 and 20. In the preferred embodiment of the present invention, the filter bracket 50 is structured and arranged to removably support the air filter 48 behind the venting area 26 of the venting device 20 and to position the filter component 64 thereof in substantial alignment with the venting area 26 so all of the air from the air duct 14 will pass through and be filtered by the air filter 48. The filter bracket 50 being configured to allow the air filter 48 to be removed will allow a person to remove the air filter 48 and visually inspect the filter component 64 to determine if the air filter 48 needs to be cleaned or replaced and, if so, to clean or replace the air filter 48. In the embodiment shown in the figures, filter bracket 50 is a two-piece bracket which comprises a first filter bracket 50*a* towards the first end 34 of the venting device 20 and a second filter bracket 50*b*, as best shown in FIGS. 7 and 9-11. Each of the filter brackets 50*a*/50*b* have a proximal end 68 that is attached to or integral with the back surface 60 of the venting device 20 and a distal end 70 that extends rearwardly therefrom towards the back end 56 of the filter apparatus 10, with the terms "proximal" and "distal" utilized with regard to the filter brackets 50*a*/50*b* in reference to the back surface 60 of venting device 20. Each of the filter brackets 50*a*/50*b* comprise a rearward extending member 72 and a pair of inward extending members, shown as first inward extending member 74 at their distal end 70 and a second inward extending member 76 in spaced apart relation to the first inward extending member 74 that is positioned generally toward the proximal end 68 thereof, as best shown in FIG. 11 (with the term "inward" referring to the direction toward the venting area 26 where the air filter 48 will be placed, as shown in FIGS. 6 and 7). As best shown in FIGS. 11 and 12 with regard to first filter bracket 50*a*, the inward extending members 74/76 of each of the filter brackets 50*a*/50*b* form a generally U-shaped section 78 that defines an open area 80 between the inward extending members 74/76. The U-shaped section 78 of the first filter bracket 50*a* is positioned with the open area 80 thereof in the direction toward the open area 80 of the generally U-shaped section 78 of the second filter bracket 50*b*, as best shown in FIGS. 6 and 7. Each of the two opposing open areas 80 of the two filter brackets 50*a*/50*b* are dimensionally sized and configured to removably receive air filter 48 therein, as best shown in FIG. 3.

In a preferred embodiment, the two filter brackets 50*a*/50*b* are spaced apart from each other a filter bracket width FBW amount, as shown in FIG. 6, that is selected to be substantially the same as the width of the air filer 48, shown as filter width FW in FIG. 3, so the two outer sides of the filter frame 66 will slidably engage the two U-shaped sections 78 to frictionally hold the air filter 48 in place between the two open areas 80 of the filter brackets 50*a*/50*b*, as shown in FIGS. 3 and 19-20. Preferably, the positioning of the filter brackets 50*a*/50*b* is selected so there is sufficient frictional engagement between the two U-shaped sections 78 and the filter frame 66 of the air filter 48 to securely hold the air filter 48 in place (i.e., so the air filter 48 will not easily fall out of the filter apparatus 10) but to also allow the user to relatively easily slide the air filter 48 out between the filter brackets 50*a*/50*b* when he or she needs to inspect, clean and/or replace the air filer 48.

Figure 8:
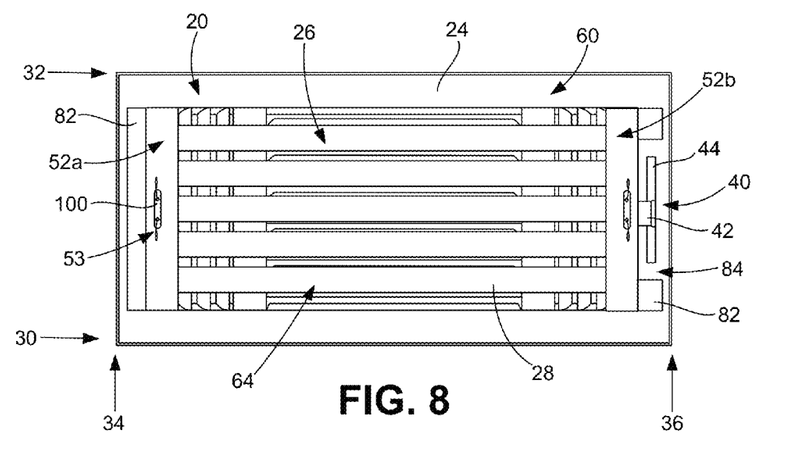
FIG. 8 is a back view of the air duct filter apparatus of FIG. 6.

As set forth above, the filter brackets 50*a*/50*b* are attached to or integral with the back surface 60 of the venting device 20. In the embodiment shown in the figures, each filter bracket 50*a*/50*b* has a generally outwardly extending mounting member 82, as best shown in FIGS. 9-14, that is attached to the back surface 60 of venting device 20, as best shown in FIG. 8. Depending on the materials selected for the venting device 20 and the filter brackets 50*a*/50*b*, the filter brackets 50*a*/50*b* can be attached to the back surface 60 of the venting device 10 by welding or by using adhesives. To make allowance for the lever 42 and slot 44 of the adjusting mechanism 40, the second filter bracket 50*b* has a cut-out section 84, best shown in FIGS. 8, 10 and 14, that allow the lever 42 to move in the slot 44 so the user can adjust the opening 28 between the louvers 38 to direct the air from the air duct 14 as he or she chooses. If desired, both filter brackets 50*a* and 50*b* can have the cut-out section 84 to simplify manufacturing and assembly of the filter apparatus 10.

Figure 18:
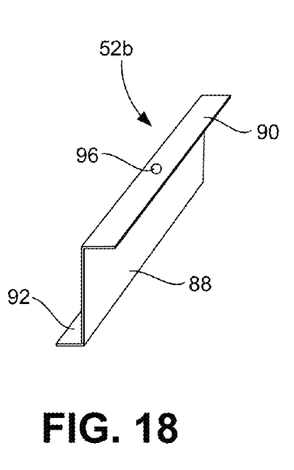
FIG. 18 is a front perspective view of a second duct bracket.

Each of the first inward extending members 74 of the filter brackets 50*a*/50*b* are provided with a pair of apertures 86, best shown in FIGS. 9 and 10, that are sized and configured to allow a portion of the duct connecting mechanism 53 to pass through the first inward extending member 74 and engage the duct brackets 52. As set forth in more detail below, this portion of the duct connecting mechanism 53 extends rearward from the filter brackets 50*a*/50*b* to engage the respective duct brackets 52*a*/52*b*, as shown in FIGS. 3 and 18-19, in a manner that allows the venting device 10 and the components associated therewith, namely the air filter 48 and filter brackets 50, to slide out away from the duct brackets 52 and the surface 22 so the user can have easy access to the air filter 48 to inspect the filter component 64 thereof and then clean and/or replace the air filter 48 as may be necessary or otherwise beneficial.

Figure 16:
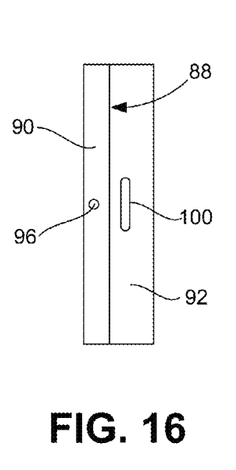
FIG. 16 is a front view of the first duct bracket of FIG. 15.
Figure 17:
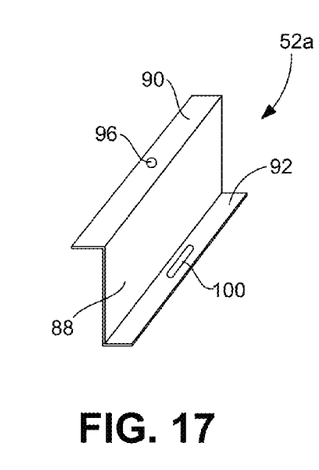
FIG. 17 is a front perspective view of the first duct bracket of FIG. 16.

As set forth above, the venting device 20 connects to air duct 14 using a duct connecting mechanism 53 that connects the filter brackets 50*a*/50*b* to duct brackets 52*a*/52*b*. The duct brackets 52*a*/52*b* are positioned at the duct opening 16 so as to be in corresponding relation to the filter brackets 50*a*/50*b* such that when the user positions the venting device 20, with the air filter 48 held in place by the filter brackets 50*a*/50*b*, at the duct opening 16 the duct connecting mechanism 52 that extends rearwardly from the back end 56 of the filter apparatus 10 to be received by and engage the duct brackets 52*a*/52*b*, as best shown in FIGS. 3, 15, 19 and 20 (with FIG. 15 only showing duct bracket 52*a* attached to the surface 22 around duct opening 16). Each of the duct brackets 52*a*/52*b*, separately shown in FIGS. 16-18, are structured and arranged to be mounted to the surface 22 next to the duct opening 16 and to receive and engage the duct connecting mechanism 53. In the embodiment shown in the figures, each of the duct brackets 52*a*/52*b* comprise a rearward extending member 88, an outward extending member 90 and an inward extending member 92 that are formed in a Z-shaped configuration, as best shown in FIGS. 17 and 18. When in use, the outward extending member 90 is placed in abutting relation with the surface 22 at the duct opening 16 with the rearward extending member 88 against the inner sidewall 94 of the air duct 14 to position the inward extending member 92 at a point either at the filter brackets 50*a*/50*b* (as shown in FIG. 19) or beyond where the filter brackets 50*a*/50*b* will be when the back surface 60 of the venting device 20 is in position against the surface 22, as best shown in FIGS. 15, 19 and 20. In a preferred configuration, each duct bracket 52*a*/52*b* has an aperture 96 in the outward extending member 90 that is positioned on the outward extending member 90 so as to be in alignment with an aperture 98 in the surface 22 (as shown in FIG. 15 opposite where the first duct bracket 52*a* is attached), where the wall connecting element 46 secures the prior art air duct register to the surface 22. This allows a person to remove an existing prior art register from the surface 22, attach the duct brackets 52*a*/52*b* in place by aligning the aperture 96 in the outward extending member 90 with the aperture 98 in the surface 22, secure the duct brackets 52*a*/52*b* to the surface 22 around the duct opening 16 using wall connecting element 46 and then connect the venting device 20 to the duct brackets 52*a*/52*b* using the duct connecting mechanism 53 (as described in more detail below) to use the new filter apparatus 10.

In a preferred embodiment of the filter apparatus 10 of the present invention, the venting device 20 (with the air filter 48 removably secured thereto by the filter brackets 50*a*/50*b*) is secured to the surface 22 around the duct opening 16 in a manner that allows a person to easily, quickly and without tools remove the air filter 48 from the venting device 20 so he or she may inspect the air filter 48 and then clean or replace the air filter 48 as necessary or desired. In the embodiment shown in the figures, each of the duct brackets 52a/52b have a slot 100 in the inward extending member 92, as best shown in FIGS. 15-17, that is cooperatively sized and configured with the duct connecting mechanism 53 to receive and engage components of the duct connecting mechanism 53 in a manner that allows the venting device 20 to securely move inward and outward relative to the air duct 14 at the duct opening 16 without falling away from the duct opening 16, as shown with regards to FIGS. 19 and 20, to allow the user to be able to easily slide the air filter 48 out from between the pair of filter brackets 50a/50b.

In the embodiment of the filter apparatus 10 shown in the figures, the duct connecting mechanism 53 is a U-shaped flexible spring wire 102 that extends rearward through the apertures 86 in the first inward extending member 74, with the U-portion at the proximal end 104 of the duct connecting mechanism 53 able to prevent the wire 102 from passing through or becoming dislodged from the first inward extending member 74. Each of the wires 102 (at each side of the venting device 20, as best shown in FIGS. 3, 6-7 and 19-20) has a pair of enlarged distal ends 106 that are sized and configured to fit within a slot 100 of the respective duct brackets 52a/52b at the duct opening 16 and engage the sides of the slot 100 to prevent the venting device 20 from moving further way from the duct opening 16 than one-half the length of the flexible wire 102 (as shown in FIG. 20). With the enlarged distal end 106 of the wires 102 through the slot 100 of the duct brackets 52a/52b and the venting device 20 at the duct opening 16 (i.e., the back surface 60 thereof against the surface 22), the filter apparatus 10 will be in its closed position 108, as shown in FIG. 19. When the venting device 20 is pulled away from the surface 22, the flexible wire 102 will expand to cause the enlarged distal ends 106 of the flexible wire 102 to engage the sides of the slot 100 and hold the venting device 20, with the air filter 48 in between the two filter brackets 50a/50b, close to but away from the surface 22, placing the filter apparatus 10 in its open position 110, as shown in FIG. 20. The flexible wire 102 should be selected such that when the two portions thereof expand apart against the sides of the slot 100 the wire 102 will provide sufficient force against the slot 100 to prevent the venting device 20 from falling when the filter apparatus 10 is in the open position 110, as shown in FIG. 20. When the venting device 20 is pushed inward, towards the closed position 108, the apertures 86 in the first inward extending member 74 will collapse the wire 102 and allow the venting device 20 to be placed against the surface 22, as shown in FIG. 19. If the user needs to completely remove the venting device 20 from the duct opening 16, all he or she has to do is to manually collapse the wire 102 when the filter apparatus 10 is in its open position 110 and pull the enlarged distal ends 106 of the wire 102 through the slot 100.

The air duct circulating system 12 of the present invention, shown in FIGS. 19 and 20, comprises the filter apparatus 10 described above, a tubular air duct 14 that terminates at a duct opening 16 so treated or conditioned air from the air duct 14 can be discharged through the venting device 20, after being filtered by the air filter 48, into the space 18 to heat, cool or otherwise affect the space. In contrast to prior art air ventilation systems, any dirt, dust, pollen or other materials (including contaminants) that are in the air duct 14, which can be of considerable length, will not be discharged into the space. Instead, the air filter 48 will filter out these undesirable materials from the air. As such, the air duct circulating system 12 and filter apparatus 10 of the present invention solves the air quality problems that are associated with presently available air duct circulating systems.

To use the filter apparatus 10 and air duct circulating system 12 of the present invention in an existing air duct circulating system, the user merely has to remove the existing prior art register (or other venting device) and replace it with the new filter apparatus 10, which will typically have a similarly configured venting device 20. With regard to homes, offices, stores and like structures that utilize a register to control the discharge of air from an HVAC unit, the user removes the wall connecting elements 46 and then removes the prior art register. To install the new filter apparatus 10, the user first positions a duct bracket 52a/52b along the surface 22 at each side of duct opening 16 (such as is done for a first duct bracket 52a in FIG. 15) by aligning the aperture 96 in the outward extending member 74 with the aperture 98 in the surface 22 and then secures the duct brackets 52a/52b to the surface 22, typically by reusing the same wall connecting element 46 that was used to secure the prior art register to the surface 22. Once the two duct brackets 52a/52b are in place along the opposite sides of the duct opening 16, the user will position the venting device 20 in place by collapsing the flexible wire 102 of the duct connecting mechanism 53 and inserting the enlarged distal ends 106 into the slot 100 in the inward extending member 92 of the duct brackets 52a/52b. When the user releases the wire 102, the U-shaped configuration of the wire 102 will expand to move the two distal ends 106 apart and press them against the sides of the slot 100 to engage the duct connecting mechanism 53 with the slot 100. At this point, the user can let go of the venting device 20 and the filter apparatus 10 will be in its open position 110, as shown in FIG. 20. If the air filter 48 is not in place between the two filter brackets 50a/50b, behind the lovers 38 in the venting area 26 of the venting device 20, the user will slide an air filter 48 into place. As described above, in a preferred configuration, the air filter 48 will be held in place by the frictional engagement between the filter brackets 50a/50b and the filter frame 66 of the air filter 48. With the air filter 48 in place, the user places the filter apparatus 10 in its closed position by pressing against the front surface 58 of the venting device 20 to push the venting device 20 into the air duct 14 at the duct opening 16. The venting device 20 will move the enlarged distal ends 106 of the flexible wire 102 rearward until the back surface 60 of the venting device 20 is in abutting relation with the surface 22 and the filter apparatus 10 is in its closed position 108, as shown in FIG. 19. With the venting device 20 (i.e., a register) in place against the surface 22, treated or conditioned air will flow from the air duct 14 to the space 18 through the air filter 48, removing any materials and contaminants from the air before it is discharged to the space 18.

Periodically, the user or another person will want to check the air duct circulating system 12 to verify that the air filter 48 is still functioning as desired. To access the air filter 48, a person merely pulls outward on the frame 24 of venting device 20 to pull the venting device 20, and the air filter 48, away from the duct opening 16 and surface 22, placing the filter apparatus 10 in its open position 110 (as shown in FIG. 20). To simplify pulling the frame 24, venting device 20 and air filter 48 away from the duct opening 16, the filter apparatus 10 can be provided with one or more pull knobs 112, such as the pair of pull knobs 112 shown in FIGS. 2, 3, 6 and 7, that are attached to or integral with the frame 24 for the user to grab when he or she wants access to the air filter 48. In one embodiment, the pull knobs 112 can be attached to the frame 24 at the openings in the frame 24 that were previously utilized with the wall connecting element 46 to secure the prior art register to the surface 22. With the filter apparatus 10 in its open position 110, the user can easily remove the air filter 48 from between the pair of filter brackets 50a/50b to inspect the air filter 48 to determine if it needs cleaning or replacement. The duct connecting mechanism 53 eliminates the need for the user to hold onto the venting device 20 while removing or installing the air filter 48. Once the air filter is inspected and then, as necessary, cleaned or replaced, the filter apparatus 10 is placed back in its closed position 108 (FIG. 19) by pressing against the front surface 58 of the venting device 20 until the back surface 60 thereof is against the surface 22 and the venting device 20 is back in place in the duct opening 16 in its closed position (FIG. 20). The unique design of the new filter apparatus 10 of the present invention filters the air that is discharged from an air duct 14 before the air passes through the venting device 20 to the space 18 and allows a person to easily and quickly access the air filter 48 for inspection, cleaning or replacement without requiring the use of any tools.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there are numerous components described herein that can be replaced with equivalent functioning components to accomplish the objectives of the present invention.

What is claimed is:

1. A filter apparatus to filter air being discharged from an air duct into a space at a duct opening in a surface associated with the space, said filter apparatus comprising:
   a venting device having frame defining a venting area with one or more openings through which the air passes from the air duct into the space when said filter apparatus is in a closed position with a back surface of said venting device in abutting relation to the surface at the duct opening disposing a front surface of said venting device toward the space;
   an air filter having a filter component configured to filter the air;
   one or more filter brackets attached to or integral with the venting device, said one or more filter brackets being structured and arranged to position said filter component of said air filter substantially between said air duct and said venting area so as to filter the air coming from inside the air duct before the air is discharged to the space through the venting device so as to remove contaminants from the air prior to the air being discharged into the space;
   one or more duct brackets attached to or integral with one of the air duct and the surface at the duct opening; and
   a connecting mechanism interconnecting said one or more duct brackets and at least one of said venting device and said one or more filter brackets, said connecting mechanism structured and arranged to selectively allow said filter apparatus to be moved between said closed position and an open position with said venting device and said air filter in spaced apart relation with the surface and the duct opening to allow access to said air filter to inspect and/or remove said air filter from said filter brackets without requiring tools, said connecting mechanism comprising a flexible spring wire having a proximal end at one of said venting device and said one or more filter brackets and a distal end disposed through a slot at said one or more duct brackets, said flexible spring wire configured to expand and engage said slot when said venting device is pulled away from the surface so as to support said venting device in spaced apart relation to the surface when said filter apparatus is in said open position and to collapse when said venting device is pushed inward towards the surface to place said filter apparatus in said closed position.

2. The filter apparatus of claim 1, wherein said venting device further comprises one or more louvers in said venting area so as to define a plurality of said openings for the air to pass from the air duct to the space.

3. The filter apparatus of claim 2 further comprising an adjusting mechanism associated with said one or more louvers, said adjusting mechanism structured and arranged to adjust the size of said openings.

4. The filter apparatus of claim 3, wherein said adjusting mechanism comprises a lever accessible from at or near said front surface of said venting device.

5. The filter apparatus of claim 1, wherein said filter apparatus comprises a first filter bracket and a second filter bracket, said first filter bracket and said second filter bracket being in spaced apart relation so as to receive said air filter therebetween.

6. The filter apparatus of claim 5, wherein said first filter bracket and said second filter bracket are cooperatively sized and configured with said air filter so each of said first filter bracket and said second filter bracket will frictionally engage said air filter to securely position said filter component of said air filter rearward of said venting area of said venting device.

7. The filter apparatus of claim 6, wherein each of said first filter bracket and said second filter bracket comprise a proximal end attached to or integral with said back surface of said venting device, a distal end positioned rearwardly from said back surface of said venting device, a rearward extending member generally extending between said proximal end and said distal end and a U-shaped section at said distal end defining an open area, said air filter extending between said open area of said first filter bracket and said open area of said second filter bracket so as to frictionally engage said U-shaped section of said first filter bracket and said U-shaped section of said second filter bracket.

8. The filter apparatus of claim 7 further comprising a mounting member at said proximal end of each of said first filter bracket and said second filter bracket, each of said mounting members attached to said back surface of said venting device.

9. The filter apparatus of claim 1, wherein said filter apparatus comprises a first duct bracket and a second duct bracket in spaced apart relation to each other, each of said first duct bracket and said second duct bracket having an outward extending member sized and configured to be placed against the surface at said duct opening, each of said outward extending members having an aperture positioned so as to be in alignment with an aperture in the surface when said duct members are secured at said duct opening.

10. The filter apparatus of claim 9, wherein each of said first duct bracket and said second duct bracket comprise an inwardly extending member, said slot disposed in said inwardly extending member of each of said first duct bracket and said second duct bracket, said flexible spring wire of said duct connecting mechanism structured and arranged to engage said slot in said inwardly extending member, said distal end of said flexible spring wire being enlarged so as to engage said slot and hold said venting device below said surface when said filter apparatus is in said open position.

11. The filter apparatus of claim 10, wherein each of said one or more filter brackets have a pair of apertures disposed therein to slidably receive said flexible spring wire so as to facilitate expanding and collapsing of said flexible spring wire as said filter apparatus moves between said open position and said closed position.

12. A filter apparatus to filter air being discharged from an air duct into a space at a duct opening in a surface associated with the space, said filter apparatus comprising:
 a venting device having frame defining a venting area with one or more openings through which the air passes from the air duct into the space when said filter apparatus is in a closed position with a back surface of said venting device in abutting relation to the surface at the duct opening disposing a front surface of said venting device toward the space;
 an air filter having a filter component configured to filter the air;
 a first filter bracket attached to or integral with said venting device;
 a second filter bracket attached to or integral with said venting device and disposed in spaced apart relation to said first filter bracket, each of said first filter bracket and said second filter bracket being structured and arranged to receive said air filter therebetween so as to position said filter component of said air filter substantially rearward of said venting area so as to filter the air coming from inside the air duct before the air is discharged to the space through the venting device so as to remove contaminants from the air prior to the air being discharged into the space;
 a first duct bracket attached to or integral with one of the air duct and the surface at the duct opening;
 a second duct bracket in spaced apart relation to said first duct bracket, said second duct bracket attached to or integral with one of the air duct and the surface at the duct opening; and
 a first flexible spring wire interconnecting said first duct bracket and at least one of said venting device and said first filter bracket and a second flexible spring wire interconnecting said second duct bracket and at least one of said venting device and said second filter bracket, each of said flexible spring wires structured and arranged to selectively allow said filter apparatus to be moved between said closed position and an open position with said venting device and said air filter in spaced apart relation with the surface and the duct opening to allow access to said air filter to inspect and/or remove said air filter from between said first filter bracket and said second filter bracket without requiring tools, each of said flexible spring wires having a proximal end at said at least one of said venting device and said first filter bracket or said second filter bracket and a distal end disposed through a slot at said first duct bracket or said second duct bracket, said flexible spring wire configured to expand and engage said slot when said venting device is pulled away from the surface so as to support said venting device in spaced apart relation to the surface when said filter apparatus is in said open position and to collapse when said venting device is pushed inward towards the surface to place said filter apparatus in said closed position.

13. The filter apparatus of claim 12, wherein said venting device further comprises one or more louvers in said venting area so as to define a plurality of said openings for the air to pass from the air duct to the space.

14. The filter apparatus of claim 13 further comprising an adjusting mechanism associated with said one or more louvers, said adjusting mechanism structured and arranged to adjust the size of said openings.

15. The filter apparatus of claim 12, wherein said first filter bracket and said second filter bracket are cooperatively sized and configured with said air filter so each of said first filter bracket and said second filter bracket will frictionally engage said air filter to securely position said filter component of said air filter rearward of said venting area of said venting device.

16. The filter apparatus of claim 15, wherein each of said first filter bracket and said second filter bracket comprise a proximal end attached to or integral with said back surface of said venting device, a distal end positioned rearwardly from said back surface of said venting device, a rearward extending member generally extending between said proximal end and said distal end and a U-shaped section at said distal end defining an open area, said air filter extending between said open area of said first filter bracket and said open area of said second filter bracket so as to frictionally engage said U-shaped section of said first filter bracket and said U-shaped section of said second filter bracket.

17. The filter apparatus of claim 12, wherein each of said first duct bracket and said second duct bracket have an outward extending member sized and configured to placed against the surface at said duct opening, each of said outward extending members having an aperture positioned so as to be in alignment with an aperture in the surface when said duct members are secured at said duct opening.

18. The filter apparatus of claim 17, wherein each of said first duct bracket and said second duct bracket comprise an inwardly extending member with a slot therein, said duct connecting mechanism structured and arranged to engage said slot in said inwardly extending member.

19. An air duct filtering system, comprising:
 an air duct configured to carry air;
 a space selected to receive the air;
 a surface associated with said space;
 an air duct opening in said surface for discharging the air into said space; and
 a filter apparatus to filter the air before the air is discharged into said space through said air duct, said filter apparatus having a venting device with a venting area through which the air passes into said space, an air filter having a filter component selected to filter the air, a pair of filter brackets attached to or integral with the back surface of the venting device to position said filter component of said air filter substantially rearward of said venting area so as to filter the air coming from inside the air duct before the air is discharged to the space through the venting device so as to remove contaminants from the air prior to the air being discharged into the space, a pair of duct brackets attached to or integral with at least one of the air duct and the surface at the duct opening, and a connecting mechanism interconnecting said pair of duct brackets and at least one of said venting device and said pair of filter brackets, said connecting mechanism structured and arranged to selectively allow said filter apparatus to be moved between a closed position having said back surface of said venting device in abutting relation to said surface at said duct opening and an open position having said venting device and said air filter in spaced apart relation with said surface and said duct opening to allow access to said air filter to inspect and/or remove said air filter from said filter brackets without requiring tools, said connecting mechanism comprising a flexible spring wire having a proximal end at one of said venting device and each of said pair of filter brackets and a distal end disposed through a slot at each of said pair of duct brackets, said flexible spring wire configured to expand and engage said slot when said venting device is pulled away from the surface so as to support said venting device in spaced apart relation to the surface when said filter apparatus is in said open position and to collapse when said venting device is pushed inward towards the surface to place said filter apparatus in said closed position.

20. The filtering system of claim 19, wherein said pair of filter brackets are cooperatively sized and configured with said air filter so each of said pair of filter brackets will frictionally engage said air filter to securely position said filter component of said air filter rearward of said venting area of said venting device.

\* \* \* \* \*